United States Patent
Lin et al.

(10) Patent No.: US 7,682,194 B2
(45) Date of Patent: Mar. 23, 2010

(54) ELECTRICAL CARD CONNECTOR ASSEMBLY WITH A PCB MOUNTED SHIELD

(75) Inventors: Kuo-Lung Lin, Tu-cheng (TW); Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/228,733

(22) Filed: Aug. 14, 2008

(65) Prior Publication Data

US 2009/0047830 A1 Feb. 19, 2009

(30) Foreign Application Priority Data

Aug. 14, 2007 (TW) .............................. 96129917 A

(51) Int. Cl.
*H01R 13/648* (2006.01)
(52) U.S. Cl. .............. 439/607.31; 439/630; 439/607.35
(58) Field of Classification Search ............ 439/607.31, 439/607.22, 607.35, 630; 361/816
See application file for complete search history.

(56) References Cited

U.S. PATENT DOCUMENTS

| | | | |
|---|---|---|---|
| 6,394,843 B1 * | 5/2002 | Chang et al. ........... | 439/607.22 |
| 6,540,557 B1 | 4/2003 | Yu | |
| 6,997,743 B1 * | 2/2006 | Su et al. ..................... | 439/567 |
| 7,277,301 B2 * | 10/2007 | Liang ......................... | 361/816 |
| 2006/0040530 A1 * | 2/2006 | Miyamoto .................. | 439/95 |

* cited by examiner

*Primary Examiner*—Edwin A. Leon
*Assistant Examiner*—Vanessa Girardi
(74) *Attorney, Agent, or Firm*—Andrew C. Cheng; Wei Te Chung; Ming Chieh Chang

(57) ABSTRACT

An electrical card connector assembly (100) includes an electrical card connector and a printed circuit board (PCB) (4). The electrical card connector includes an insulating housing (2), a plurality of terminals (31) received in the insulating housing and a metal shield (1) covering the insulating housing to define a card receiving room. The insulating housing forms an upper face (20), a lower face (21) and two lateral walls (22) and defines at least one cavity (24). The lateral walls form a plurality of blocks (221). The metal shield includes a base (11), a pair of sidewalls (12) and at least one elastic piece (110) extending along a card insertion direction. The sidewalls define openings (121) receiving the blocks of the sidewalls and form at least one retention portion (120). The base forms a baffle (13) at a rear edge thereof. The PCB is attached with the lower face of the insulating housing and electrically connected with the terminals. Both the retention portion and the baffle press against a lower surface of the PCB and the elastic piece extends into the cavity by a horizontal movement of the metal shield relative to the insulating housing and the PCB.

16 Claims, 6 Drawing Sheets

ELECTRICAL CARD CONNECTOR ASSEMBLY WITH A PCB MOUNTED SHIELD

BACKGROUND OF THE INVENTION

1. Field of the Invention

The present invention relates generally to electrical card connector assemblies, and more particularly to an assembly having an electrical card connector and a printed circuit board (PCB), where the electrical card connector is assembled.

2. Description of Related Arts

Two traditional methods of assembling an electrical card connector onto a PCB are a screwing method and a soldering method. However, these two methods are troublesome and time-consuming because of screwing and soldering process. An unusual assembling method, as known, is disclosed by a PC card connector having an insulating housing, a top shield, a bottom shield and a grounding plate for preventing EMI. The top shield forms a pair of retention tabs, each having a vertical portion and a horizontal portion. The bottom shield forms a pair of cutouts defined in a rear end thereof, which is approximately shaped in a character "T". The bottom shield further comprises a pair of extending tabs, and correspondingly, the grounding plate comprises a pair of slits. In assembly, the retention tabs of the top shield are first aligned with and extend through the cutouts of the bottom shield. And then, the bottom shield moves in a front-to-rear direction until the extending tabs are aligned with and inserted into the corresponding slits of the grounding plate. Meanwhile, each retention tab moves from a first slot into a second slot of the cutout, whereby a horizontal portion of the retention tab presses against a flat surface of the bottom shield, and a vertical portion abuts against a front edge of the second slot. The bottom shield is assembled to the connector thereby. However, if the extending tab can be inserted into the slit in practice, the extending tab is easily divorced from the slit along an opposite direction; that means, the bottom shield is assembled to the connector not firmly.

Hence, an improved electrical card connector assembly is desired.

SUMMARY OF THE INVENTION

Accordingly, an object of the present invention is to provide an electrical card connector assembly having an electrical card connector and a PCB, which two are firmly assembled.

To achieve the above object, an electrical card connector assembly includes an electrical card connector and a printed circuit board (PCB). The electrical card connector includes an insulating housing, a plurality of terminals received in the insulating housing and a metal shield covering the insulating housing to define a card receiving room. The insulating housing forms an upper face, a lower face and two lateral walls and defines at least one cavity. The lateral walls form a plurality of blocks. The metal shield includes a base, a pair of sidewalls and at least one elastic piece extending along a card insertion direction. The sidewalls define openings receiving the blocks of with the sidewalls and form at least one retention portion. The base forms a baffle at a rear edge thereof. The PCB is attached with the lower face of the insulating housing and electrically connected with the terminals. Both the retention portion and the baffle press against a lower surface of the PCB and the elastic piece extends into the cavity by a horizontal movement of the metal shield relative to the insulating housing and the PCB.

Other objects, advantages and novel features of the invention will become more apparent from the following detailed description when taken in conjunction with the accompanying drawings.

DETAILED DESCRIPTION OF THE PREFERRED EMBODIMENT

Referring to FIGS. 1-6, an electrical card connector assembly 100 includes an electrical card connector (not labeled) and a PCB 4, and the electrical card connector comprises a metal shield 1, an insulating housing 2 and a terminal module 3, which is installed on the PCB 4 and also received in the insulating housing 2. The metal shield 1 associates with the insulating housing 2 to define a card receiving room (not labeled) for receiving an electrical card (not shown), and accordingly, a card insertion/ejection direction and a card inserting port are also defined: an end adjacent to the card inserting port is defined as a front end while the other end distant away from the card inserting port is defined as a rear end, an upper side is defined as the electrical card connector located upside the PCB while a lower side is defined as the PCB 4 located below the electrical card connector. The terms "front, rear, upper and lower" are not meant to be limiting but are descriptive of depiction according to claims.

Figure 1:
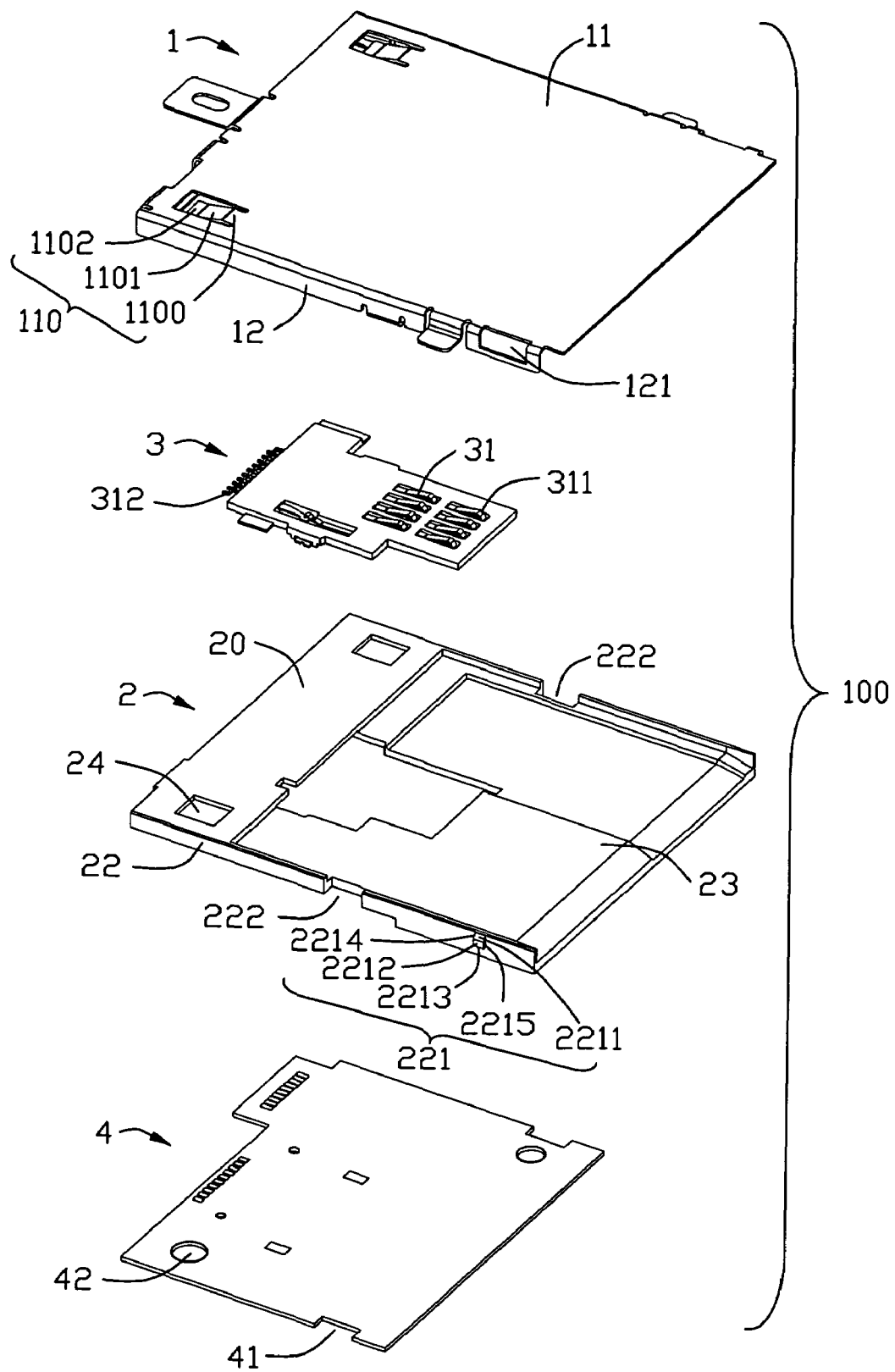
FIG. 1 is a perspective, exploded view of an electrical card connector assembly according to the present invention.
Figure 2:
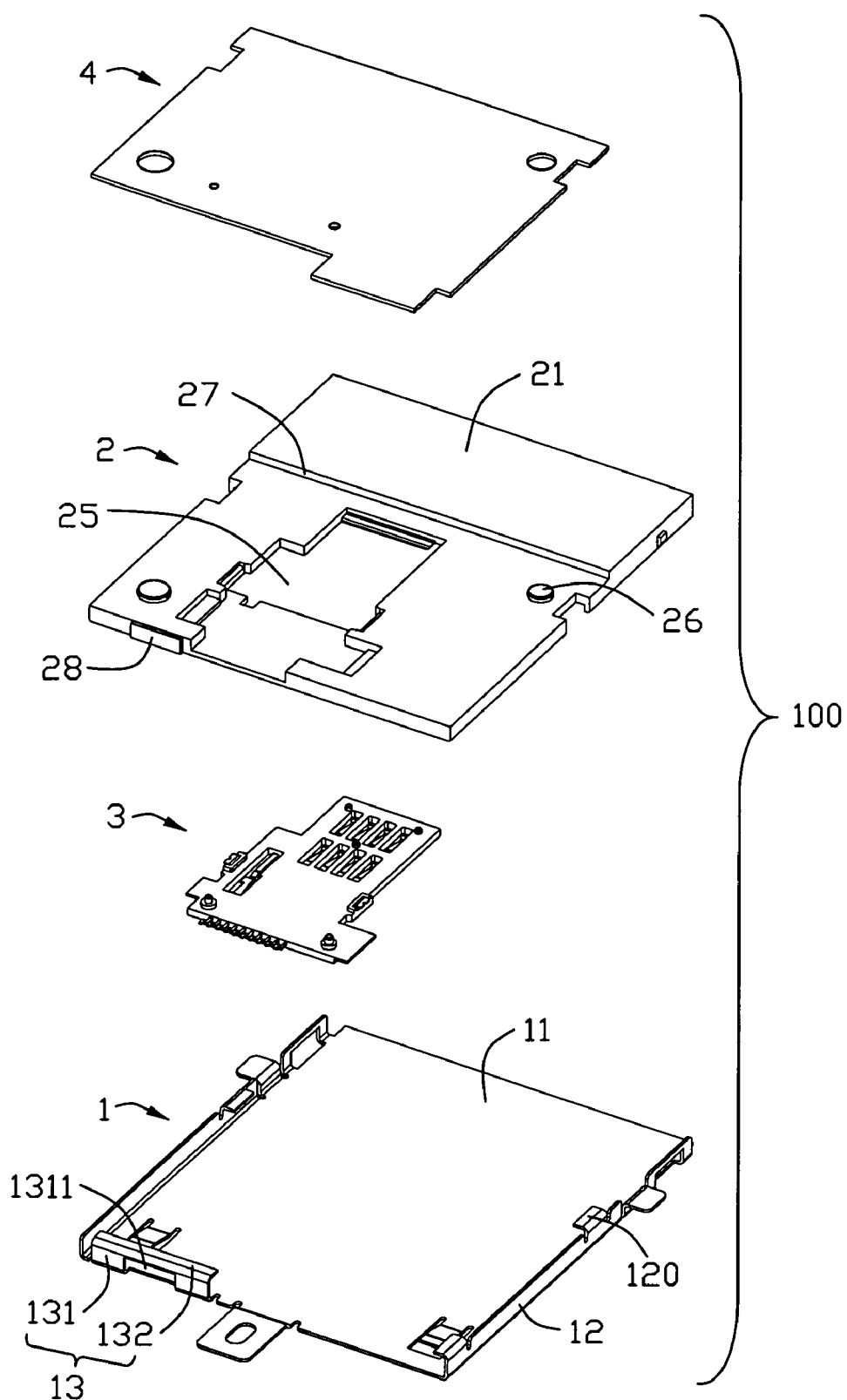
FIG. 2 is a view similar to FIG. 1, but taken from a different aspect.
Figure 3:
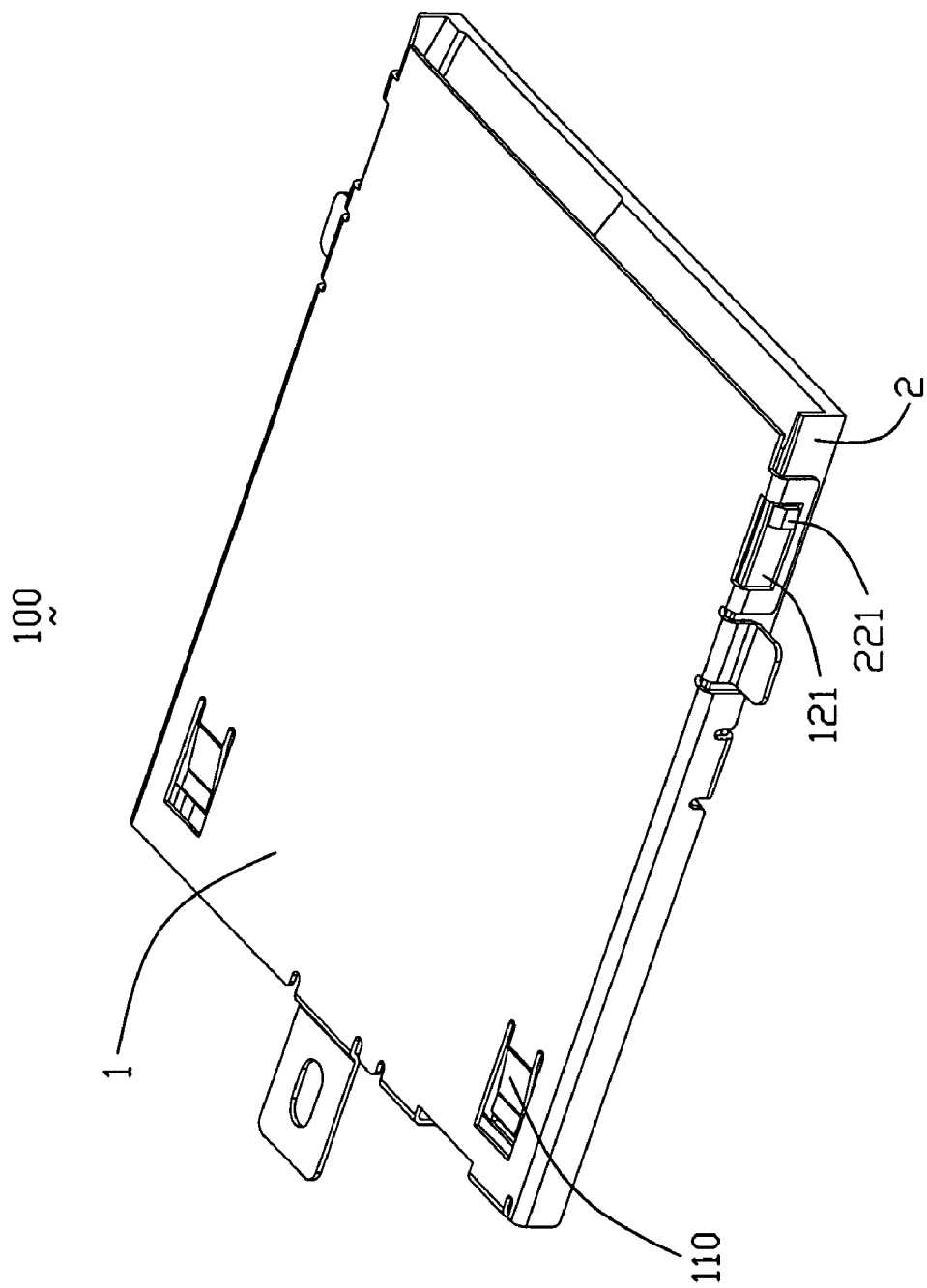
FIG. 3 is a perspective, assembled view of the electrical card connector installed on the PCB but not achieved a fixed performance.
Figure 4:
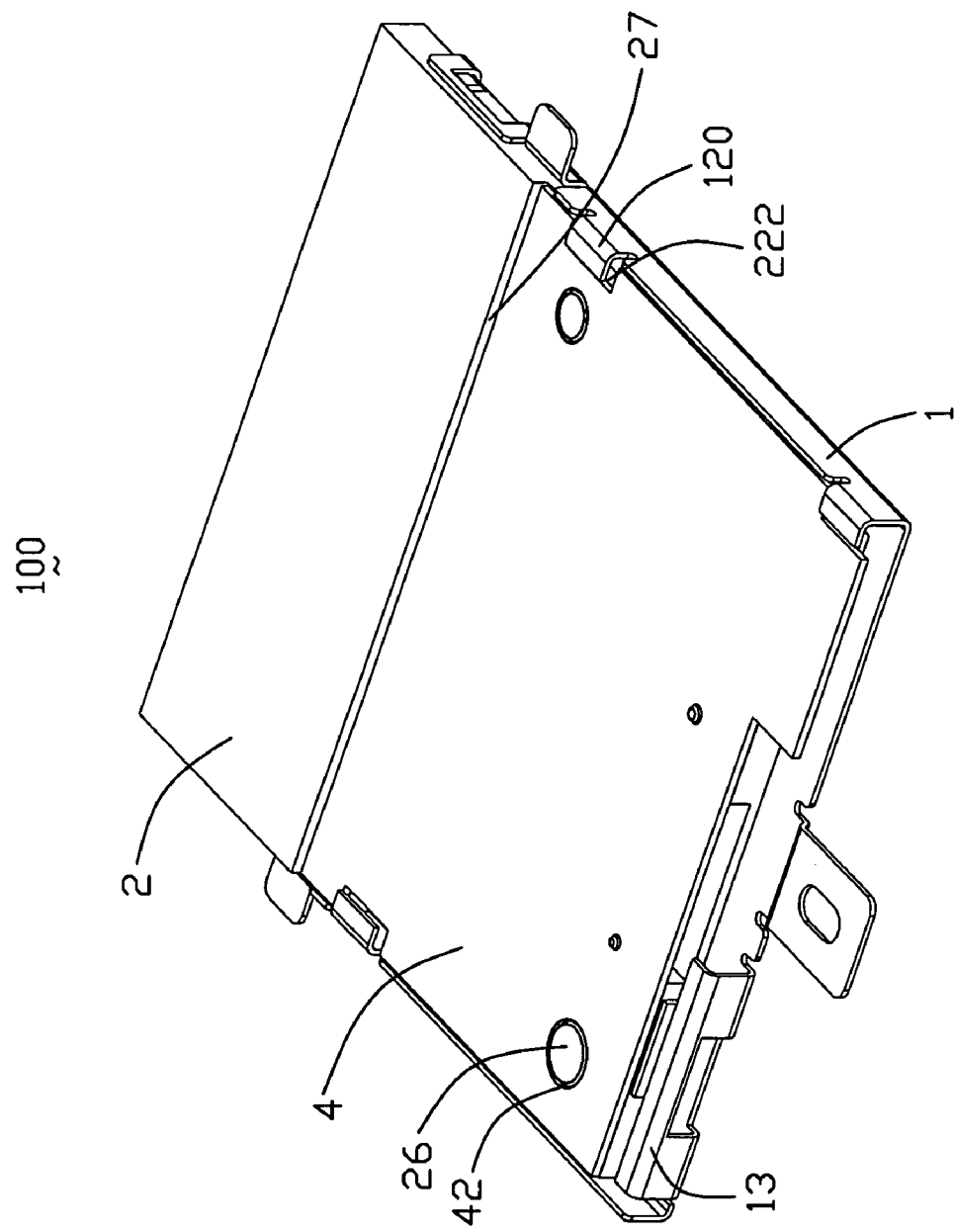
FIG. 4 is a view similar to FIG. 3, but taken from a different aspect.
Figure 5:
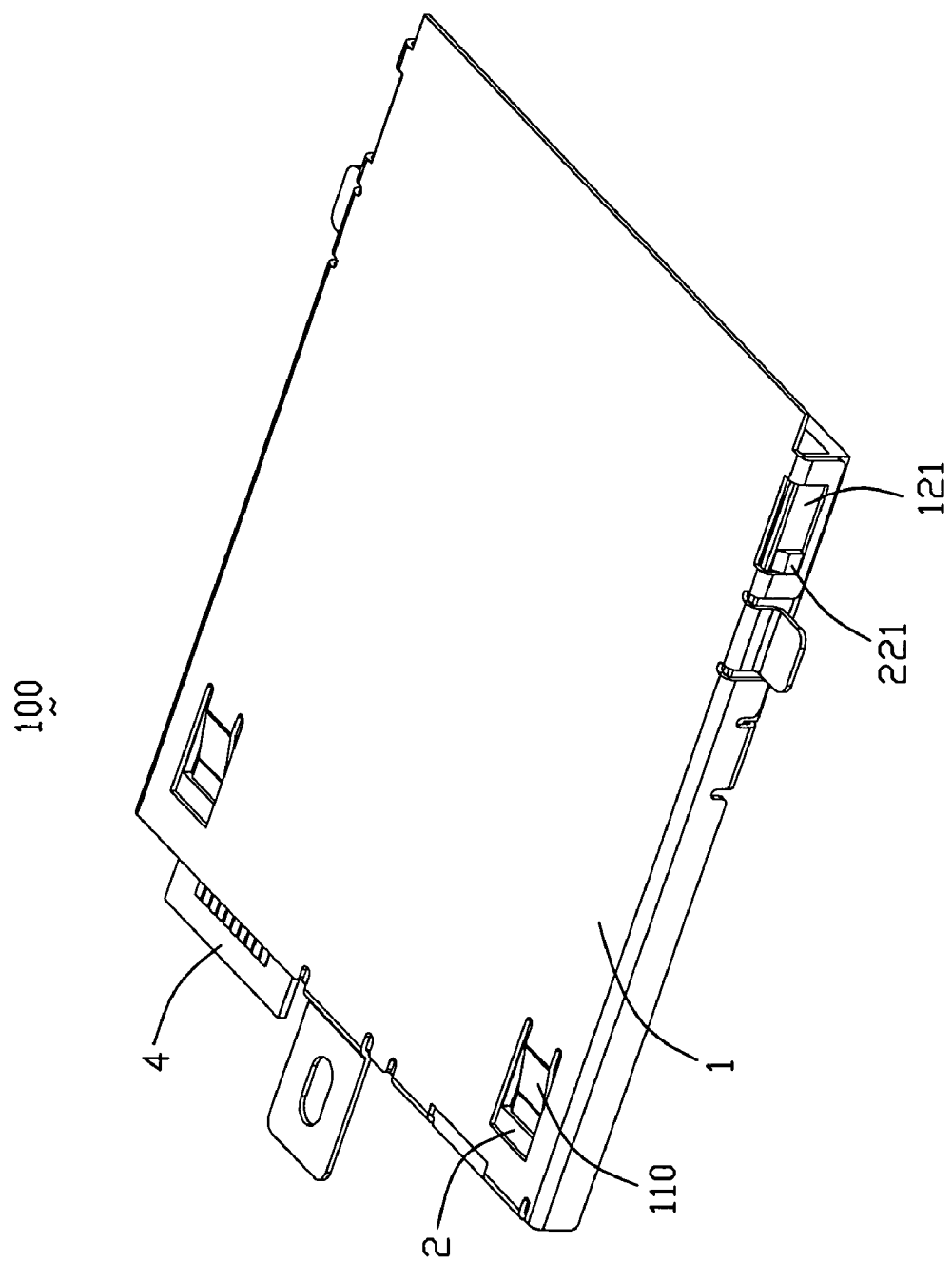
FIG. 5 is a perspective, assembled view of the electrical card connector installed on the PCB fixedly.
Figure 6:
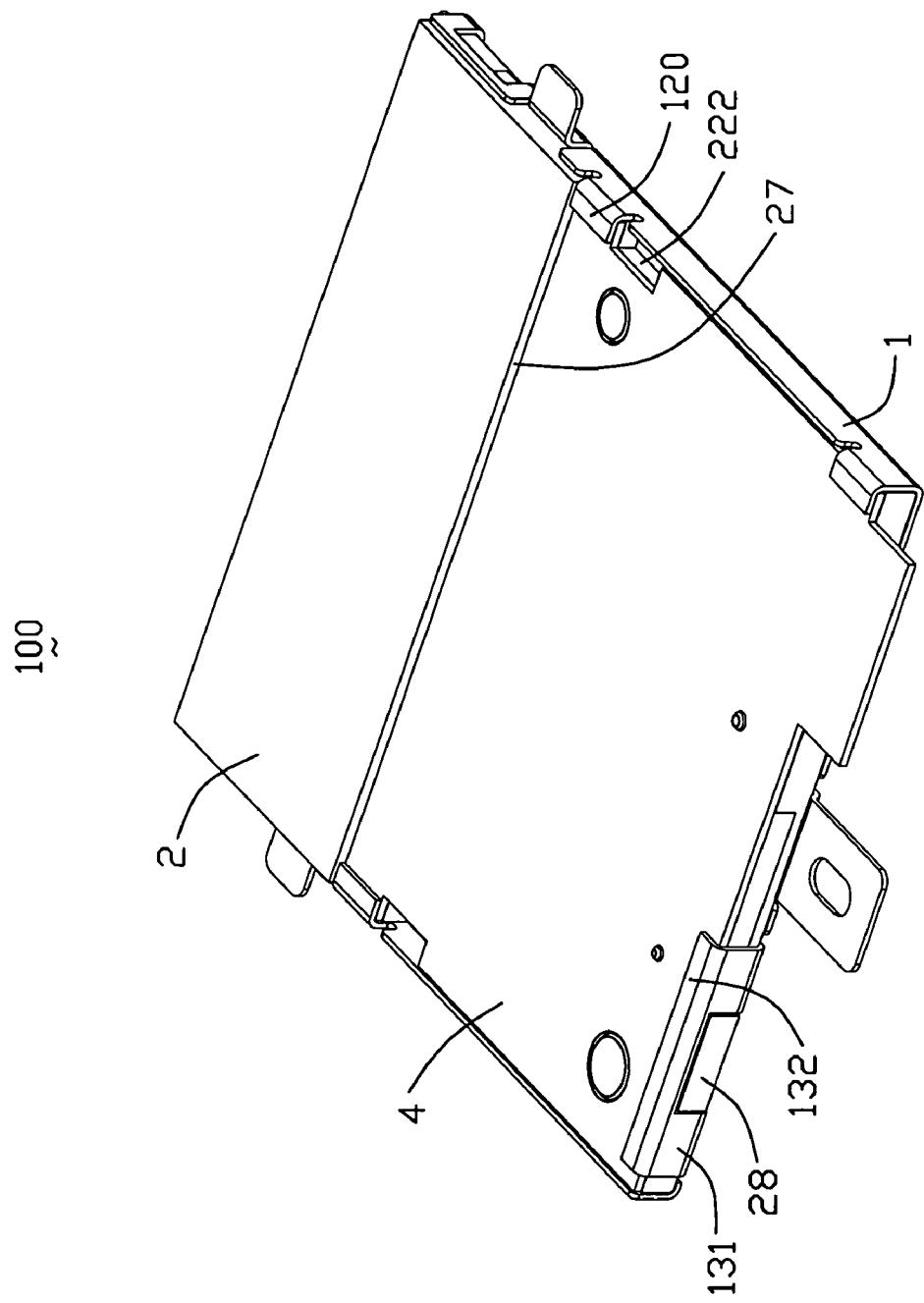
FIG. 6 is a view similar to FIG. 5, but taken from a different aspect.

Referring to FIGS. 1-2, the metal shield 1 comprises a base 11 and a pair of sidewalls 12 extending vertically and downwardly from two edges of the base 11. Each sidewall 12 forms at least a retention portion 120 extending into the card receiving room at a free edge thereof. A lengthwise opening 121 is defined on each sidewall 11. The base 11 forms a pair of elastic pieces 110 at a rear part thereof and generally speaking, the elastic pieces 110 extend along the card insertion direction and bend into the card receiving room. Each elastic piece 110 comprises a jointing portion 1100 extending rearward from the base 11, an inclined portion 1101 bending rearward into the card receiving room from a distal end of the jointing portion 1100 and a mating portion 1102 further extending rearward from a distal end of the inclined portion 1101, along a direction parallel to the jointing portion 1100. The base 11 forms a baffle 13 at a rear end thereof and the baffle 13 comprises an upstanding portion 131 extending vertically from a rear edge of the base 11 and a horizontal portion 132 bending right-angled into the card receiving room from a free end of the upstanding portion 131. An aperture 1311 is defined on the upstanding portion 131.

Referring to FIGS. 1-2, 4, 6, the insulating housing 2 comprises an upper face 20, a lower face 21 and two lateral walls 22. Each lateral wall 22 forms a block 221 protruding into the opening 121 of the metal shield 1. The block 221 comprises an inclined surface 2211 at an upper side thereof, a holding surface 2212 located in an upstanding estate just under the inclined surface 2211, a resisting surface 2213 horizontally connecting the holding surface 2212 and the lateral wall 22, a left confronting surface 2214 and a right confronting surface 2215 opposite to the left confronting surface 2214. Each lateral wall 22 is recessed in the middle thereof to be a cutout 222. The upper face 20 is excavated to be a valley 23 taking up a large area at a front part thereof and a pair of cavities 24 each smaller than the valley 23 at a rear part thereof. The lower face 21 forms a step 27 at a junction section between a front part and a rear part. The lower face 21 is excavated to be a receiving space 25 for receiving the terminal module 3 and a pair of protrusions 26 at the rear part thereof. Especially, the protrusions 26 are disposed at two sides of the receiving space 25 for stability. The insulating housing 2 further forms a protuberance 28 at a rear surface (not labeled) thereof.

Referring to FIGS. 1 and 2, the terminal module 3 is appropriately received in the receiving space 25 of the insulating housing 2 and comprises a plurality of terminals 31 preformedly insert-molded therein. The terminals 31 comprise contacting portions 311, arranged in two-row arrays, mating with the corresponding contacts (not shown) of the inserted electrical card and soldered portions 312, arranged along a line, soldered with the PCB 4.

Referring to FIGS. 1 and 2, the PCB 4 is adhered to the rear part of the lower face 21 of the insulating housing 2, defines a pair of notches 41 at two edges thereof and the notches 41 corresponds to the cutouts 222 of the insulating housing 2. The PCB 4 further defines a pair of hollows 42 therein for correspondingly receiving the protrusions 26 of the insulating housing 2.

In assembly, first, the terminal module 3 is assembled onto the PCB 4 and then, the insulating housing 2 covers the terminal module 3 from a top side to receive the terminal module 3 in the receiving space 25 thereof, and accordingly, the protrusions 26 of the insulating housing 2 are received in the hollows 42 of the PCB 4 for positioning the insulating housing 2, all of which said above are familiar to a person having ordinary skill in the art, but a character of the present invention is that the cutouts 222 of the insulating housing 2 are superposed on the notches 41 of the PCB 4 after the insulating housing 2 covers the terminal module 3 from a top side.

Following, because the cutouts 222 of the insulating housing 2 are superposed on the notches 41 of the PCB 4, the retention portions 120 of the metal shield 1 go across the cutouts 222 of the insulating housing 2 and then, the notches 41 of the PCB 4 in sequence, in practice, the retention portions 120 go across the cutouts 222 and the notches 41 almost simultaneously, to achieve a lower level of the PCB 4. And meanwhile, the block 221 is located in the opening 121 of the metal shield 1 under a guidance of the inclined surface 2211, with the resisting surface 2213 supported by the sidewall 22 for providing a retaining force in a vertical direction between metal shield 1 and the insulating housing 2. The mating portion 1102 of the elastic piece 110 is supported by the upper face 20 of the insulating housing 2 so that the elastic piece 110 has elasticity ready to be released; the baffle 13 is distant away from rear edges of the insulating housing 2 and the PCB 4, referring to FIGS. 3 and 4. Till now, the metal shield 1 is not easy to disengage away from the insulating housing 2 along the vertical direction, but the metal shield 1 can move along a level direction relative to the insulating housing 2.

Then, the metal shield 1 moves along the card ejection direction relative to the insulating housing 2, until the left confronting surface 2214 is stopped by the sidewall 12, the retention portions 120 abut the step 27 and prevents the metal shield 1 from moving unboundedly; the elasticity of the elastic pieces 110 releases so that the mating portions 1102 are inserted into the cavities 24 of the insulating housing 2 and prevent the metal shield 1 from moving along an opposite direction. In this embodiment, rear edges of the insulating housing 2 and the PCB 4 confront the upstanding portion 131 of the baffle 13 so as to provide another force for confining the further movement of the metal shield 1 along the card ejection direction and accordingly, the horizontal portion 132 mates with a lower surface of the PCB 4 for providing another retaining force in the vertical direction between metal shield 1 and the insulating housing 2. The protuberance 28 is appropriately received in the aperture 1311. In such a way that the metal shield 1 is fixed to the insulating housing 2. Till now, the whole assembling process is over, which is shown as FIGS. 5 and 6.

In a second embodiment, the electrical card connector of the prevent invention can be alternatively soldered with the PCB 4, the notches 41 of the PCB 4 are needless accordingly. In assembly, the retention portions 120 of the metal shield 1 go across the cutouts 222 of the insulating housing 2 and move to press against the lower face 21 of the insulating housing 2 and lean against the step 27 at the jointing section between the front part and the rear part of the insulating housing 2.

In the two embodiments, in fact, whether the elastic pieces 110 extend along the card insertion direction or not is not limiting, the elastic pieces 110 extending along the card ejection direction is also feasible, but the baffle 13 is needless therein: Differently, the right confronting surface 2215 of the block 221 is stopped by the sidewall 12.

In the two embodiments, whether the elastic pieces 110 are formed on the base 11 or not and whether the matable cavities 24 are defined on the upper face 20 of the insulating housing 2 are both not limiting, the elastic pieces 110 alternatively formed on the sidewalls 12 are also feasible, of course, the matable cavities 24 are correspondingly defined on the lateral walls 22 of the insulating housing 2.

The present invention provides both a retaining force in the vertical direction and a positioning force along the level direction, so that, the electrical card connector is firmly assembled onto the PCB 4.

While a preferred embodiment in accordance with the present invention has been shown and described, equivalent modifications and changes known to persons skilled in the art according to the spirit of the present invention are considered within the scope of the present invention as described in the appended claims.

We claim:

1. An electrical card connector assembly comprising:
   an electrical card connector comprising:
   an insulating housing forming an upper face, a lower face and two lateral walls and defining at least one cavity, the lateral walls forming a plurality of blocks;
   a plurality of terminals received in the insulating housing; and
   a metal shield covering the insulating housing to define a card receiving room, the metal shield comprising a base, a pair of sidewalls and at least one elastic piece extending along a card insertion direction, the sidewalls defining openings receiving the blocks of the lateral walls, the sidewall further forming at least one retention portion and the base forming a baffle at a rear edge thereof; and
   a printed circuit board (PCB) defining a top surface and a bottom surface, wherein the top surface is attached to the lower face of the insulating housing and is electrically connected with the terminals; wherein both the retention portions and the baffle press against the bottom surface of the PCB and the elastic piece extends into the cavity by a horizontal movement of the metal shield relative to the insulating housing.

2. The electrical card connector assembly as described in claim 1, wherein the block comprises an inclined surface, a resisting surface and left and right confronting surfaces, and the resisting surface and the left confronting surface interfere with the sidewall.

3. The electrical card connector assembly as described in claim 1, wherein the elastic piece has an inclined portion and a mating portion extending from a distal end of the inclined portion to be received in the cavity.

4. The electrical card connector assembly as described in claim 1, wherein the terminals comprise, contacting portions, arranged in two-row arrays, mating with corresponding contacts of an inserted electrical card and soldered portions, arranged along a line, soldered with the PCB.

5. The electrical card connector assembly as described in claim 1, wherein the lateral walls have cutouts and the retention portions are positioned below the insulating housing by passing through the cutouts.

6. The electrical card connector assembly as described in claim 1, wherein said horizontal movement of the metal shield is also relative to PCB.

7. The electrical card connector assembly as described in claim 1, wherein the PCB comprises a plurality of notches and the lateral walls have cutouts aligned with the notches.

8. The electrical card connector assembly as described in claim 7, wherein the retention portions are positioned at the bottom surface of the PCB by passing across the cutouts of the insulative housing and the notches of the PCB in sequence.

9. The electrical card connector assembly as described in claim 8, wherein the retention portion abuts a step which is formed at a junction section between a front part and a rear part of the lower face of the insulating housing.

10. The electrical card connector assembly as described in claim 1, wherein the baffle comprises an upstanding portion confronting rear edges of the insulating housing and the PCB, and a horizontal portion pressing against the bottom surface of the PCB.

11. The electrical card connector assembly as described in claim 10, wherein an aperture is defined on the upstanding portion and the insulating housing forms a protuberance received in the aperture.

12. An electrical card connector assembly comprising:
an electrical card connector comprising:
an insulating housing forming an upper face, a lower face and two lateral walls and defining at least one cavity, the lateral walls forming a plurality of blocks;
a plurality of terminals received in the insulating housing; and
a metal shield covering the insulating housing to define a card receiving room, the metal shield comprising a base, a pair of sidewalls and at least one elastic piece extending along a card ejection direction, the sidewalls defining openings where the blocks are received for providing an interference fit with the sidewalls, the sidewall further forming at least one retention portion; and
a printed circuit board (PCB) defining a top surface and a bottom surface, wherein the top surface is attached to the lower face of the insulating housing and is electrically connected with the terminals; wherein
the retention portion presses against the bottom surface of the PCB or the lower face of the insulating housings and the elastic piece extends into the cavity because of the metal shield's level movement relative to the insulating housing and the PCB.

13. The electrical card connector assembly as described in claim 12, wherein the block comprises an inclined surface, a resisting surface and left and right confronting surfaces, and the resisting surface and the right confronting surface interfere with the sidewall.

14. An electrical connector comprising:
an insulative housing;
a metallic shell attached to a top portion of the housing and cooperating with the housing to defines a card receiving space;
a plurality of terminals disposed in the housing with contacting sections extending into the card receiving space; and
a printed circuit board attached to an underside of the housing opposite to the shell; wherein
a first cutout is formed in a side region of the housing; wherein
an L-shaped retention portion is formed on a side region of the shell under a condition that a horizontal section of the retention portion passes through the cutout in a vertical direction and is successively moved in a horizontal direction from a first horizontal position to a second horizontal position so as to have the horizontal section positioned beneath the housing; wherein
an elastic piece formed on the shell extends into a cavity defined on the housing for retaining the housing and the shell together in said horizontal direction when said shell is moved to the second horizontal position.

15. The electrical connector assembly as claimed in claim 14, wherein the printed circuit board defines a second cutout formed in a side region thereof in alignment with the first cutout so as to allow said horizontal section to pass downwardly and abut against an underside of the printed circuit board when said shell is moved to the second horizontal position.

16. The electrical connector assembly as claimed in claim 14, wherein said printed circuit board includes a second cutout outside of the housing.

\* \* \* \* \*